(12) United States Patent
Smathers

(10) Patent No.: US 9,421,945 B1
(45) Date of Patent: Aug. 23, 2016

(54) VEHICLE ANTI-THEFT SYSTEM

(71) Applicant: Randall H. Smathers, Lake Mary, FL (US)

(72) Inventor: Randall H. Smathers, Lake Mary, FL (US)

(*) Notice: Subject to any disclaimer, the term of this patent is extended or adjusted under 35 U.S.C. 154(b) by 0 days.

(21) Appl. No.: 14/803,331

(22) Filed: Jul. 20, 2015

Related U.S. Application Data

(60) Provisional application No. 62/026,265, filed on Jul. 18, 2014.

(51) Int. Cl.
*B60R 25/31* (2013.01)
*B60R 25/06* (2006.01)
*B60R 25/08* (2006.01)
*B60R 25/23* (2013.01)
*B60R 25/00* (2013.01)

(52) U.S. Cl.
CPC ............... *B60R 25/31* (2013.01); *B60R 25/00* (2013.01); *B60R 25/066* (2013.01); *B60R 25/08* (2013.01); *B60R 25/23* (2013.01)

(58) Field of Classification Search
CPC ...... B60R 25/00; B60R 25/31; B60R 25/066; B60R 25/23
See application file for complete search history.

(56) References Cited

U.S. PATENT DOCUMENTS

| 4,596,303 A | 6/1986 | Tremblay |
| 9,073,504 B2 * | 7/2015 | Nedorezov ............ B60R 25/00 |
| 2014/0277973 A1 * | 9/2014 | Nedorezov ............ B60R 25/00 701/53 |

* cited by examiner

*Primary Examiner* — Faye M Fleming
(74) *Attorney, Agent, or Firm* — Allen Dyer Doppelt Milbrath & Gilchrist

(57) ABSTRACT

A vehicle anti-theft system is configured to apply indications of driver presence and absence to control of a circuit between a brake pedal switch and a park shift interlock and/or a vehicle brake. Vehicle drivability is impaired without an indication of driver presence. The driver absence indication can include the combination open driver's door and an empty driver's seat. The driver presence indication can include authorized driver identification through entry of a code or other authorization mechanism.

24 Claims, 5 Drawing Sheets

VEHICLE ANTI-THEFT SYSTEM

CROSS-REFERENCE TO RELATED APPLICATION

This application claims the benefit of U.S. Provisional Patent Application Ser. No. 62/026,265, filed on Jul. 18, 2014, the contents of which application are herein incorporated by reference in their entirety.

FIELD OF THE INVENTION

The present invention relates to a vehicle anti-theft system, and more particularly, to automatically impair vehicle drivability based on vehicle status.

BACKGROUND OF THE INVENTION

Vehicle theft often occurs when vehicles are left running and unattended. Locking or securing an unattended vehicle is not always possible in emergency situations, often due to the need to power vehicle lighting, on board computers, video and audio devices, and other vehicle features that record the events surrounding the emergency scene. For example, ambulances often have climate control devices needed to control the temperature of medications, as well as powered medical devices that must remain charged and ready for use instantly. In addition, these vehicles are also frequently exited by emergency response personnel very rapidly, making it more likely to overlook necessary steps to secure the vehicle.

As a theft prevention mechanism, it has previously been contemplated to automatically deploy the parking brake in emergency vehicles equipped with air brakes. Such methods are described in, for example, U.S. patent application Ser. No. 14/101,068, which are incorporated by reference herein in its entirety. This approach is also advantageous in that it can be readily retrofit into existing vehicles. However, the same approach is less readily adapted to vehicles without air brakes, where manual mechanical power must be applied to engage the parking brake.

SUMMARY OF THE INVENTION

In view of the foregoing, it is an object of the present invention to provide an improved anti-theft system for motor vehicles, and in particular, a system that will be effective to deter theft of emergency vehicles left unattended with the engine running. According to an embodiment of the present invention, a vehicle anti-theft system is designed to monitor the vehicle driver's presence to allow for a running and unattended vehicle to be automatically rendered undriveable when the vehicle driver is absent. The vehicle anti-theft system includes at least one sensor to indicate a vehicle driver's presence, an electronic control unit (ECU) configured to control vehicle drivability based on the driver's presence, and an input device connected to the ECU for receiving an authorization for vehicle drivability. The authorization enables the vehicle to be drivable, when the driver presence is detected.

In one aspect, the ECU impairs vehicle drivability by interrupting the connection between the brake pedal and the park shift interlock of the vehicle to impair vehicle drivability, when the driver's absence is detected. The ECU enables vehicle drivability by maintaining the connection, when the vehicle driver's presence is detected and an authorization signal is received from the input device.

In another aspect, the ECU applies at least one brake of a vehicle to impair vehicle drivability when the driver's absence is detected. The ECU releases the at least one brake of the vehicle to enable vehicle drivability, when the driver's presence is detected and an authorization signal is received from the input device.

In another aspect, the input device is configured to indicate one or more of driver's seat occupancy, door position and parking brake status of the vehicle by a light pattern, a light color and/or a sound pattern and a sound pitch.

According to a further aspect, the system includes a manual override mechanism to control drivability of the vehicle via directly controlling circuit between the brake pedal and the park shift interlock of the vehicle and/or at least one vehicle brake without the operation of the ECU.

According to an additional aspect, the one or more sensors to detect the driver's presence includes a driver door position sensor in communication with the ECU configured to indicate the position of the driver door (open or closed), and a driver seat sensor in communication with the ECU configured to indicate the status of the driver seat (occupied or empty). The indication of driver absence requires both the driver door in the open position and the driver seat unoccupied for a predefined amount of time.

According to a method aspect, a method of operating the vehicle anti-theft system includes detecting the vehicle driver's presence. When the driver's absence is detected, interrupting a connection between the brake pedal and the park shift interlock of the vehicle via an ECU, disabling vehicle drivability. When the driver's presence is detected and an authorization signal is received, the connection between the brake pedal and the park shift interlock of the vehicle is established, enabling vehicle drivability.

According to another method aspect, a method of operating the vehicle anti-theft system includes detecting the vehicle driver's presence. When the driver's absence is detected, at least one brake of the vehicle is applied via the ECU, impairing vehicle drivability. When the driver's presence is detected and an authorization signal is received, the at least one brake of the vehicle is released via the ECU, enabling vehicle drivability.

These and other objects, aspects and advantages of the present invention will be better appreciated in view of the drawings and their accompanying description. It will be understood, however, that that the present invention is not necessarily limited thereto.

DETAILED DESCRIPTION OF PREFERRED EMBODIMENTS

Figure 1:
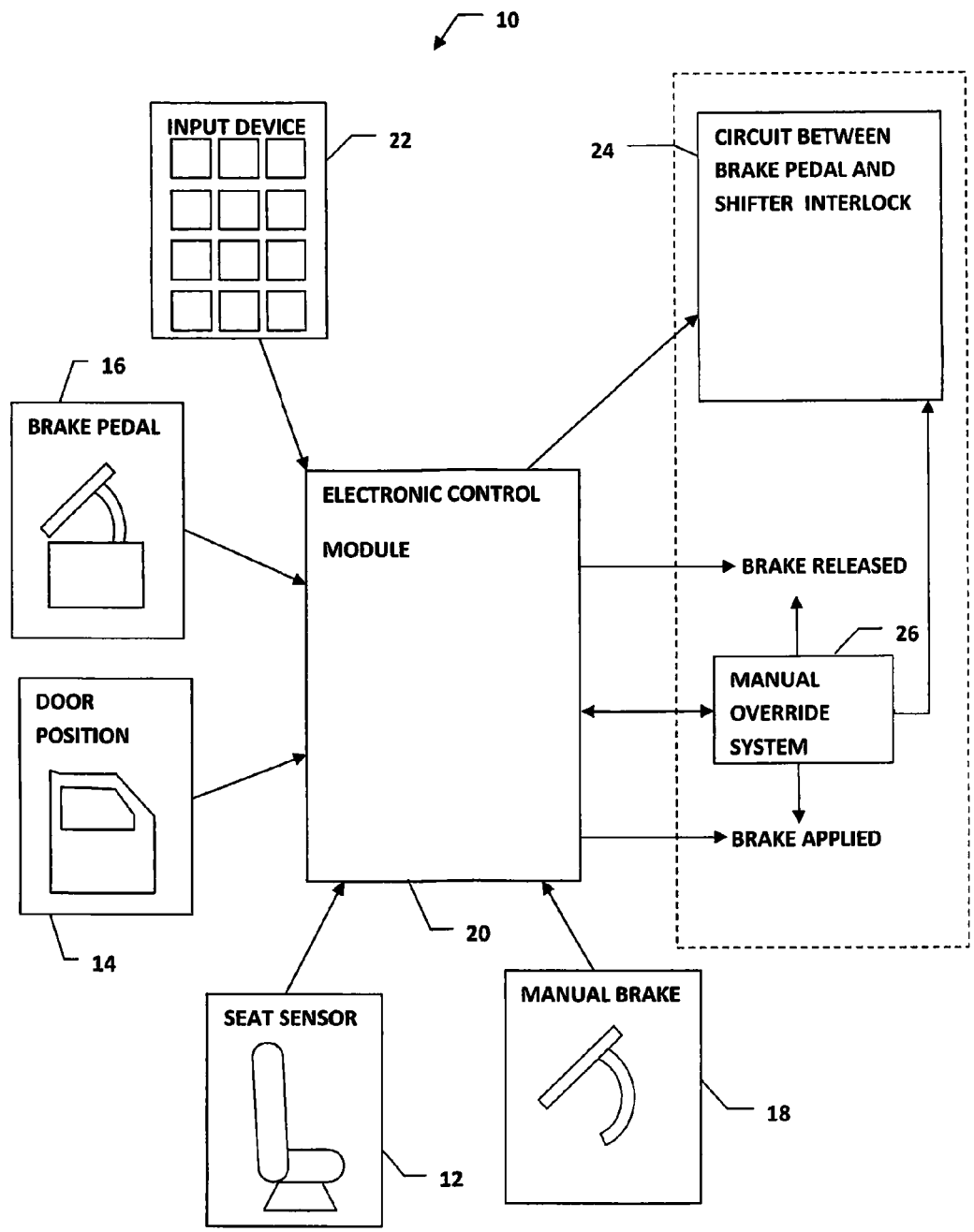
FIG. 1 is a schematic operational view of components of an vehicle anti-theft system according to the present invention.

Referring to FIG. 1, the vehicle anti-theft system 10 includes an ECU 20 configured to receive input signals from at least one sensor and generate control outputs based thereon. For example, the at least one sensor includes the driver seat sensor 12 and the driver door position sensor 14 to indicate the driver's presence or absence. The at least one sensor can also include a brake pedal position sensor 16 and a manual brake position sensor 18. The ECU 20 is configured to impair vehicle drivability when a signal indicative of driver absence is received from the at least one sensor. The vehicle anti-theft system 10 also includes an input device 22 connected to the ECU 20 to receive an authorization signal (e.g., a correct code) to enable vehicle drivability. The ECU 20 is configured to enable vehicle drivability when a signal indicative of the driver's presence is received from the at least one sensor and an authorization signal is received from the input device 22. The input device 22 is also configured to indicate driver's seat occupancy, door position, and parking brake status by a light pattern, a light color, sound pattern and/or sound pitch.

In one embodiment, the ECU 20 impairs the vehicle drivability by interrupting the circuit 24 between the brake pedal and the park shift interlock of the vehicle. The ECU 20 enables vehicle drivability by maintaining the circuit connection between the brake pedal and the park shift interlock of the vehicle. For example, one or more relays and/or switches can be used to maintain or break the circuit 24 between the brake pedal switch and the park shift interlock, rendering the vehicle drivable or undrivable.

In another embodiment, the ECU 20 disables vehicle drivability by applying at least one service brake of the vehicle and enables vehicle drivability by releasing the at least one service brake. For example, a force can be released or applied to a service brake such as a front wheel brake, a rear wheel brake, manual brake and/or a valve connected to the service brake, rendering the vehicle drivable or undrivable.

As used herein, 'electronic control unit', or ECU, refers generically to a hardware device having at least one processor and memory media. The ECU can be configured to receive input signals, process said signals based upon instructions/data stored in memory, and generate (or not generate) appropriate output signals.

The input device 22 could include a keypad, a biometric scanner, a radio frequency identification (RFID) reader, wireless receiver or similar mechanism for receiving an authorization input. Varying sensor types could be used for the sensors 12, 14, 16 and 18, such as contact sensors, proximity sensors, pressure switches, position sensor, etc. The ECU 20 can also drive audio and/or visual indicators, such as lights, buzzers, displays, and the like. For example, the input device 22 can include one or more lights (e.g., LED lights) and/or speakers to indicate one or more of driver's seat occupancy, door position and parking brake status by light pattern, sound pattern, light color and/or sound pitch. For example, when the driver's seat is empty, the one or more lights on the input device 22 can flash certain colors (e.g., red) fast and/or the speakers can generate a high-pitched sound. When the driver door is open, the one or more lights can flash certain colors (e.g., red) slowly and/or the speakers can generate a low-pitched sound. The one or more lights can remain a certain color (e.g., green) when the anti-theft system 10 has self checked all components and circuits.

Modern vehicles having automatic transmission are equipped with a park shift interlock that require the brake pedal to be depressed before the shifter lever can be moved from park to the intended gear selection. These vehicles also have a hand/foot brake system used to slow the vehicle if the hydraulic braking system fails. It is recommended to be used when the vehicle is parked to ensure the vehicle does not move. These features are relevant to whether a vehicle has a drivability.

In an exemplary implementation, when the driver is ready for the vehicle to be mobile again, shifting a gear selector from park to an intended gear position alone will not enable the vehicle to be mobile. The driver must also enter a predetermined authorization signal (e.g., a code) via the input device 22 (e.g., a fixed keypad), sending a signal to the ECU 20 to close the circuit between the brake pedal and the park shift interlock and/or release the force applied to a brake system. The authorization signal (e.g., a code) controls the ECU 20 and thus enables the vehicle gear selector to be moved from park to an intended gear.

The anti-theft operation can be triggered by the ECU 20 only when the vehicle driver door is open and the seat is unoccupied for a specified period of time (e.g., 20 seconds). A driver could leave the seat on going over a bump or leaning over in the vehicle to perform a task, but this alone will not trigger the anti-theft operation. The driver could open the driver door for various reasons, but this alone will not trigger the anti-theft operation. A separate timer can be applied to trigger the operation of ECU 20 after the driver's seat is unoccupied for a specified period of time.

Combining driver door position sensor 14 and seat sensor 12 advantageously indicates driver absence. If the ECU 20 receives signals indicating that the driver's seat is unoccupied and the driver's door is open, then the ECU 20 will act so as to apply automatically at least one brake of the vehicle and/or disconnect the circuit between the brake pedal switch and the park shift interlock. Requiring two independent absence indications will greatly reduce the risk of a potentially applying an anti-theft operation when a driver is present. A predetermined duration (e.g., 20 seconds) can be set for receipt of both absence indicator signals to further reduce the likelihood applying an anti-theft operation when it is not needed.

The vehicle anti-theft system 10 further comprises a manual override system 26. The manual override system 26 can bypass the ECU 20 and transmit control signals directly from a user to one or more brake systems and/or the electronic circuit between the brake pedal switch and the park shift interlock. For example, the manual override system 26 can operate directly on a coupling element connected to a parking brake, or arranged in a circuit effectively bypassing the coupling element to control a parking brake.

Although operating along generally similar principles, there are many variations in the exact components and configurations in the anti-theft system depicted in FIG. 1. Accordingly, components of the anti-theft system 10 are depicted schematically, and it will be appreciated that the present invention can be advantageously integrated into a wide variety of anti-theft system 10 implementations.

Figure 2:
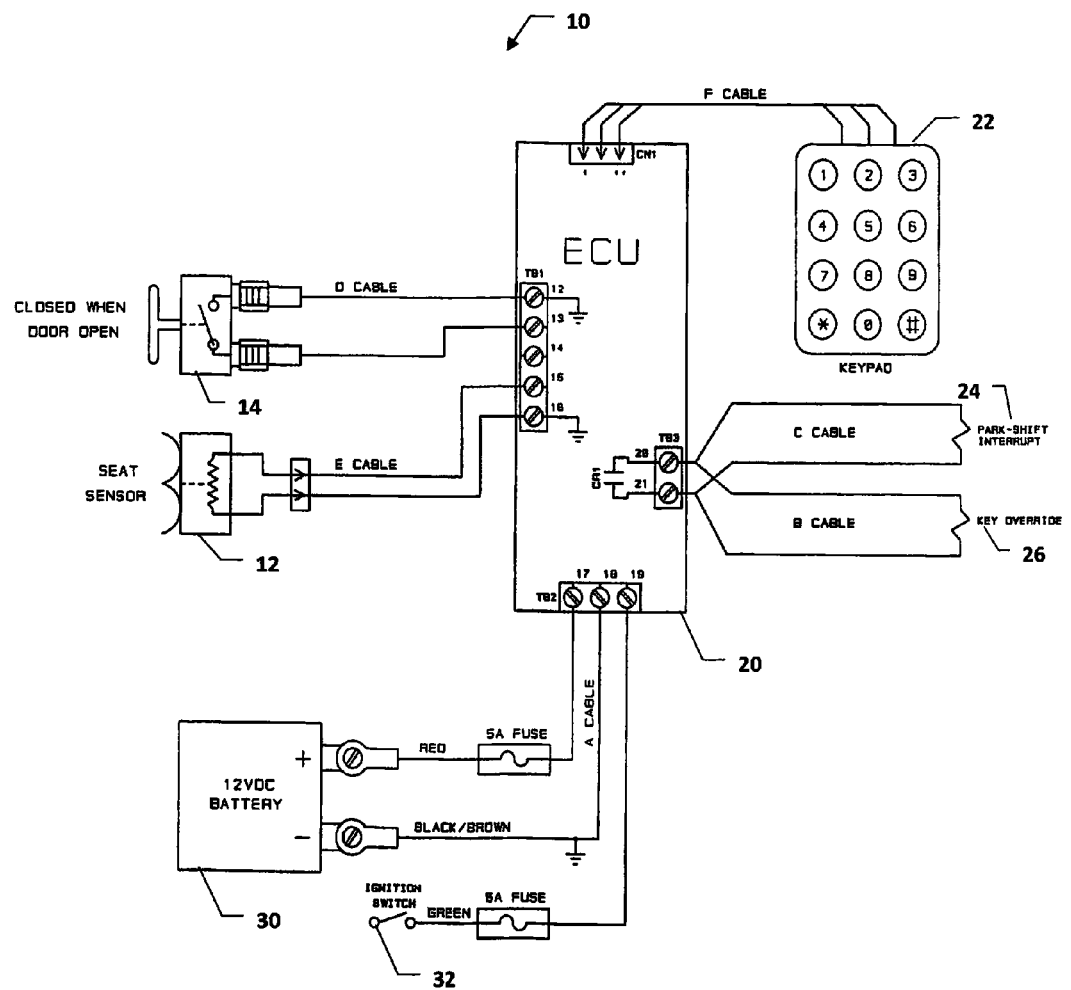
FIG. 2 is a detailed schematic operational view of components of a vehicle anti-theft system according to the present invention.

FIG. 2 a detailed schematic operational view of components of a vehicle anti-theft system according to the present invention. A 12V DC battery 30 is configured to provide power to the ECU 20 via A cable. The ECU 20 is configured to determine driver presence or absence by receiving input signals from the driver seat sensor 12 via E cable, and receiving input signals from the driver door position sensor 14 via D cable. C cable is connected to a pressure switch applying pressure on park canisters. When a user enters a correct code via the input device (e.g., keypad) 22 via F cable, the relay or switch in the circuit 24 between the brake pedal and the park shift is closed, enabling the shifter lever to be moved from park to the intended gear selection. As an example, the seat sensor 12 is configured to transmit a signal via E cable to the ECU 20 when a certain amount of weight (e.g., more than 50 lbs) is detected for a predefined amount of time (e.g., 20 seconds). As another example, the door position sensor (e.g., switch) 14 is configured to transmit a signal to the ECU 20 via D cable by closing a door position circuit. The input device 22 is a keypad for inputting one or more authorization codes. The key override system 26 is configured to directly control (e.g., close or interrupt) a brake circuit. For example, the key override system 26 can operate directly on a coupling element connected to a parking brake, or arranged in a circuit effectively bypassing the coupling element to control a parking brake via B cable.

When the driver seat is occupied, vehicle door is closed, and a parking brake applied (pressure applied on a parking brake and parking brake knob is down), LEDs on the input device 22 (e.g., keypad) is configured to be steady green. When the driver seat is occupied, vehicle door is closed, and a park brake released (no pressure applied on a parking brake and a parking brake knob is up), LEDs on the input device 22 (e.g., keypad) is configured to be steady red.

When the vehicle door is open, the input device 22 is configured to flash fast red regardless the status of a parking brake and/or occupancy of driver seat. When the driver seat is empty, the input device 22 is configured to flash slow red regardless of the status of a parking brake and/or position of a vehicle door.

Figure 3:
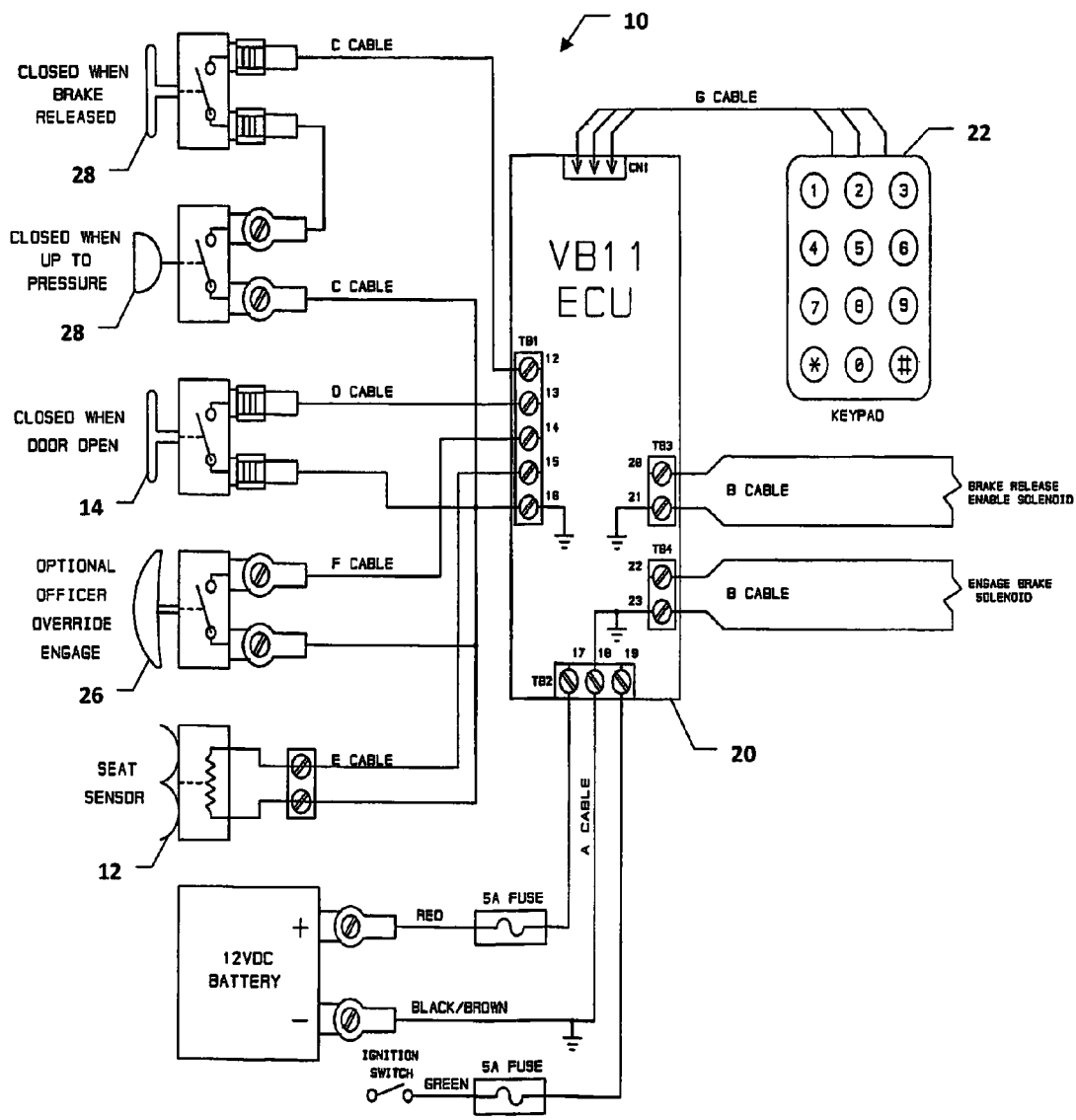
FIG. 3 is another detailed schematic operational view of components of a vehicle anti-theft system according to the present invention.

FIG. 3 is another detailed schematic operational view of components of a vehicle anti-theft system according to the present invention. The ECU 20 is configured to monitor C cable connected to a pressure switch 28 to indicate parking brake status, D cable connected to a door switch 14 to indicate door position, and E cable connected to a seat sensor 12 to indicate a seat occupancy status.

In one embodiment, C cable is connected to a pressure switch 28, when the pressure switch 28 is closed, air pressure is released from the parking brake canisters and the park brake knob is up. When the pressure switch 28 is open, air pressure is applied on the parking brake canisters and the park brake knob is down. D cable is connected to a door sensor 14 (e.g., switch), wherein a door position circuit is open when vehicle door is closed, and closes the door switch circuit when vehicle door is open. E cable is connected to a seat sensor 12, wherein the seat sensor circuit is open when driver seat is empty and seat sensor is closed when driver seat is occupied.

In one embodiment, when the driver seat is occupied, vehicle door is closed, and a park brake applied (with pressure applied and knob up), the LED on the input device 22 (e.g., keypad) indicates steady red. When the driver seat is occupied, vehicle door is closed, and a park brake released (no pressure applied and knob down), the LED on the input device 22 (e.g., keypad) indicates steady green.

When the vehicle door is open, the input device 22 is configured to flashes fast red regardless the status of C cable (e.g., whether a parking brake is applied) or status of E cable (e.g., whether driver seat is occupied). When the driver seat is empty, the input device 22 is configured to flash slow red regardless of the status of C cable (e.g., whether a parking brake is applied) or status of D cable (e.g., whether vehicle door is closed).

When the driver seat becomes unoccupied and driver's door is open, if the C cable indicates brake is released and the knob down, the ECU 20 transmits a signal to an audible speaker in the input device 22 for an alert tone for a predefined period of time (e.g., 2 seconds). If the parking brake is not set during the predefined period of time (e.g., 2 seconds), the ECU 20 sends a signal to B cable (parking brake set solenoid) to set the parking brake.

When the input device 22 is steady green, if both the driver seat becomes empty (slow red flash) and driver's door is opened (fast flash), ECU 20 closes the pressure switch 28, thus applying pressure on park canisters and locking the vehicle in parking position.

If the input device 22 shows steady red or flashing red instead of steady green when the driver's door is closed and the driver seat is occupied, then the anti-theft system needs service. The system self-checking can provide feedback to driver via color and color pattern of the input device 22.

Figure 4:
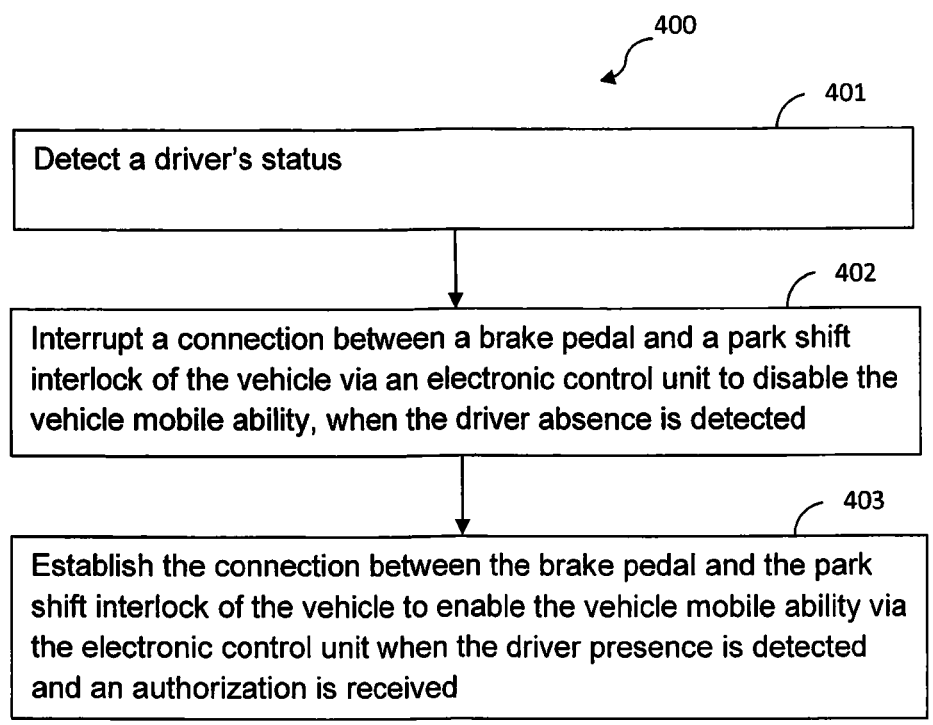
FIG. 4 is a flowchart illustrating an example vehicle anti-theft method.

FIG. 4 is a flowchart illustrating an example vehicle anti-theft method 400.

At step 401, the driver's status (absence or presence) is detected. As an example, the driver's status is detected via the driver door position sensor 14 and seat sensor 12. If the seat sensor 12 indicates the driver seat is unoccupied and the position sensor 14 indicates the driver's door is open, the driver absence is detected. If the seat sensor 12 indicates the driver seat is occupied and the position sensor 14 indicates the driver door is closed, the driver presence is detected.

At step 402, a connection between the brake pedal and the park shift interlock of the vehicle is interrupted via an ECU to impair vehicle drivability when the driver absence is detected.

At step 403, a connection between the brake pedal and the park shift interlock of the vehicle is established to enable vehicle drivability via the ECU when the driver presence is detected and an authorization (e.g., authorization code) is received.

Figure 5:
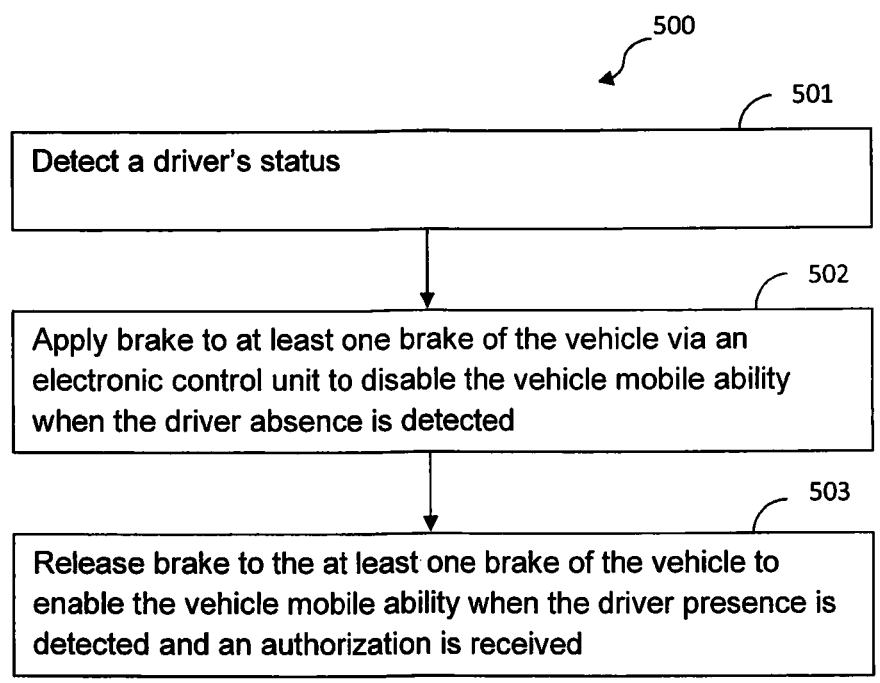
FIG. 5 is a flowchart illustrating another example vehicle anti-theft method.

FIG. 5 is a flowchart illustrating another example vehicle anti-theft method 500.

At step 501, the driver's status (presence or absence) is detected. As an example, the driver status is detected via the driver door position sensor 14 and seat sensor 12. If the seat sensor 12 indicates the driver seat is unoccupied and the position sensor 14 indicates the driver door is open, the driver absence is detected. If the seat sensor 12 indicates the driver seat is occupied and the position sensor 14 indicates the driver door is closed, the driver presence is detected.

At step 502, when the driver absence is detected, at least one brake of the vehicle is applied via an ECU to impair vehicle drivability. The brake can be applied and released via a coupling element connected to a brake or arranged in an electronic circuit, effectively bypassing the coupling element to control a brake. The input device connected to the system can indicate driver's seat occupancy, door position and parking brake status by a light pattern, sound pattern, and a light color (e.g., slow flash red, fast flash red and/or a certain sound pitch).

At step 503, when the driver presence is detected and an authorization signal is received, the at least one brake of the vehicle is released, enabling vehicle drivability. The brake can be applied and released via a coupling element connected to a brake or arranged in an electronic circuit, effectively bypassing the coupling element to control a brake. The input device connected to the system can indicate driver's seat occupancy, door position and parking brake status by a light pattern, sound pattern, and a light color (e.g., steady green and/or a certain sound pitch).

From the foregoing, it will be appreciated that the present invention augments addresses both safety problems and theft issues endemic to many modern emergency vehicles. In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. A vehicle anti-theft system comprising:
   at least one sensor to indicate a vehicle driver's presence;
   an electronic control unit configured to impair the vehicle drivability when an indication of driver absence is received from the at least one sensor; and
   an input device connected to the electronic control unit to receive an authorization, wherein the electronic control unit is configured to enable the vehicle drivability when an indication of driver presence is received from the at least one sensor and the authorization is received from the input device;
   wherein the electronic control unit interrupts the connection between a brake pedal and a park shift interlock of the vehicle when absence of a driver is indicated.

2. A vehicle anti-theft system comprising:
   at least one sensor to indicate a vehicle driver's presence;
   an electronic control unit configured to impair the vehicle drivability when an indication of driver absence is received from the at least one sensor; and
   an input device connected to the electronic control unit to receive an authorization, wherein the electronic control unit is configured to enable the vehicle drivability when an indication of driver presence is received from the at least one sensor and the authorization is received from the input device;
   wherein the electronic control unit maintains the connection between a brake pedal and a park shift interlock of the vehicle to enable the vehicle drivability when the presence of the driver is indicated and an authorization is received.

3. A vehicle anti-theft system comprising:
   at least one sensor to indicate a vehicle driver's presence;
   an electronic control unit configured to impair the vehicle drivability when an indication of driver absence is received from the at least one sensor;
   an input device connected to the electronic control unit to receive an authorization, wherein the electronic control unit is configured to enable the vehicle drivability when an indication of driver presence is received from the at least one sensor and the authorization is received from the input device; and
   a manual override system to control the vehicle drivability;
   wherein the manual override system is configured to disable the electronic control unit and control at least one service brake of the vehicle.

4. A vehicle anti-theft system comprising:
   at least one sensor to indicate a vehicle drivers presence;
   an electronic control unit configured to impair the vehicle drivability when an indication of driver absence is received from the at least one sensor;
   an input device connected to the electronic control unit to receive an authorization, wherein the electronic control unit is configured to enable the vehicle drivability when an indication of driver presence is received from the at least one sensor and the authorization is received from the input device; and
   a manual override system to control the vehicle drivability;
   wherein the manual override system is configured to disable the electronic control unit and control connection between a brake pedal and a park shift interlock of the vehicle.

5. A vehicle anti-theft system comprising:
   at least one sensor to indicate a vehicle driver's presence;
   an electronic control unit configured to impair the vehicle drivability when an indication of driver absence is received from the at least one sensor;
   an input device connected to the electronic control unit to receive an authorization, wherein the electronic control unit is configured to enable the vehicle drivability when an indication of driver presence is received from the at least one sensor and the authorization is received from the input device; and
   a manual override system to control the vehicle drivability;
   wherein the manual override system includes a keyed lock that must be unlocked before operation.

6. A vehicle anti-theft method comprising:
   detecting a driver's status;
   interrupting a connection between a brake pedal and a park shift interlock of the vehicle via an electronic control unit to impair the vehicle drivability, when the driver absence is detected; and
   establishing the connection between the brake pedal and the park shift interlock of the vehicle to enable the vehicle drivability via the electronic control unit when the driver presence is detected and an authorization is received.

7. The method of claim 6, wherein the authorization is received from an input device connected to the electronic control unit.

8. The method of claim 6, wherein the driver presence is detected when the driver's seat is occupied and the driver's door is closed.

9. The method of claim 6, wherein the driver absence is detected when the driver's seat is empty and the driver's door is open.

10. The method of claim 6, further comprising:
    manually overriding operation of the electronic control unit in an emergency situation.

11. A vehicle anti-theft method comprising:
    detecting a driver's status;
    applying brake to at least one brake of the vehicle via an electronic control unit to impair the vehicle drivability when the driver absence is detected; and
    releasing brake to the at least one brake of the vehicle to enable the vehicle drivability when the driver presence is detected and an authorization is received;
    wherein the manual override system comprises a keyed lock that must be unlocked before operation.

12. The method of claim 11, wherein the authorization is received from an input device connected to the electronic control unit.

13. The method of claim 11, wherein the driver presence is detected when the driver's seat is occupied and the driver's door is closed.

14. The method of claim 11, wherein the driver absence is detected when the driver's seat is empty and the driver's door is open.

15. The method of claim 11, further comprising manually overriding the operation of the electronic control unit in an emergency situation.

16. A vehicle anti-theft system comprising:
    at least one sensor to indicate a vehicle driver's presence;

an electronic control unit configured to impair the vehicle drivability when an indication of driver absence is received from the at least one sensor; and an input device connected to the electronic control unit to receive an authorization, wherein the electronic control unit is configured to enable the vehicle drivability when an indication of driver presence is received from the at least one sensor and the authorization is received from the input device;

wherein the input device is a keypad.

17. The vehicle anti-theft system of claim 16, wherein the at least one sensor comprises a driver's door position sensor and the driver's seat sensor.

18. The vehicle anti-theft system of claim 16, wherein presence of a driver is indicated when the driver's seat is occupied and the driver's door is closed.

19. The vehicle anti-theft system of claim 16, wherein absence of a driver is indicated when the driver's seat is empty and the driver's door is open.

20. The vehicle anti-theft system of claim 16, wherein the electronic control unit applies brake to at least one service brake of the vehicle to impair the vehicle drivability when absence of a driver is indicated.

21. The vehicle anti-theft system of claim 16, wherein the electronic control unit release brake to at least one service brake of the vehicle to enable the vehicle drivability when the presence of a driver is indicated and an authorization is received.

22. The vehicle anti-theft system of claim 16, further comprising a manual override system to control the vehicle drivability.

23. The vehicle anti-theft system of claim 16, wherein the driver's seat is indicated as empty when the driver seat is unoccupied for a predetermined period of time.

24. The vehicle anti-theft system of claim 16, wherein the input device is configured to indicate one or more of driver's seat occupancy, door position and parking brake status by one or more of a light pattern, a light color, a sound pattern and a sound pitch.

* * * * *